(12) United States Patent
Chang et al.

(10) Patent No.: US 10,412,801 B1
(45) Date of Patent: Sep. 10, 2019

(54) LIGHT-EMITTING DEVICE

(71) Applicant: EPISTAR CORPORATION, Hsinchu (TW)

(72) Inventors: Chao-Kai Chang, Hsinchu (TW); Yi-Chao Lin, Hsinchu (TW); Chang-Hseih Wu, Hsinchu (TW); Jia-Tay Kuo, Hsinchu (TW)

(73) Assignee: EPISTAR CORPORATION, Hsinchu (TW)

( * ) Notice: Subject to any disclaimer, the term of this patent is extended or adjusted under 35 U.S.C. 154(b) by 0 days.

(21) Appl. No.: 16/110,532

(22) Filed: Aug. 23, 2018

(51) Int. Cl.
   *H05B 33/08* (2006.01)
(52) U.S. Cl.
   CPC ..... *H05B 33/0842* (2013.01); *H05B 33/0806* (2013.01)
(58) Field of Classification Search
   CPC .......................... H05B 33/0842; H05B 33/0806
   USPC ........................................................ 315/291
   See application file for complete search history.

(56) References Cited

U.S. PATENT DOCUMENTS

| | | | | |
|---|---|---|---|---|
| 2014/0285099 A1* | 9/2014 | Akahoshi | ........... | H05B 33/0815 315/200 R |
| 2015/0077002 A1* | 3/2015 | Takahashi | .......... | H05B 33/0803 315/193 |

FOREIGN PATENT DOCUMENTS

| | | |
|---|---|---|
| CN | 102355771 A | 2/2012 |
| TW | M388192 U | 9/2010 |

* cited by examiner

*Primary Examiner* — Don P Le
(74) *Attorney, Agent, or Firm* — Patterson + Sheridan, LLP

(57) ABSTRACT

A light-emitting device includes a current source module having a first transistor, a first voltage control module providing a negative voltage and a second voltage control module having a second transistor. The second voltage control module is electrically connected to the current source module and the first voltage control module.

15 Claims, 8 Drawing Sheets

LIGHT-EMITTING DEVICE

TECHNICAL FIELD

The present disclosure relates to a light-emitting device, and more relate to a light-emitting device connected to an AC power input and capable of being operated under a substantially constant power.

DESCRIPTION OF THE RELATED ART

With the development of electronic technology, more and more light-emitting devices used in daily life adopt LED as light sources. The power provided to the light-emitting device is mainly consumed by the driver and the LED to generate light and heat.

In reality, the voltage applied to the light-emitting device from the mains electricity is higher during off-peak time than during peak time. The higher voltage imposed on the light-emitting device induces a higher power output of the light-emitting device.

As discussed above, the energy provided to the light-emitting device is consumed by the driver and the LED. In another aspect, the LED in the light-emitting device is designed to provide a constant light intensity at a predetermined operation condition, to reach a better power efficiency. Therefore, the increase of the voltage applied to the light-emitting device during off-peak time is barely affecting the operation condition of the LED. The major part of the increase of the voltage applied to the LED from the mains electricity is turned to be heat dissipation. However, the operation life of the LED is shortened by the increase of heat. Accordingly, what is needed in the art is an improved light-emitting device to avoid the influence from the increase of the input voltage.

SUMMARY OF THE DISCLOSURE

The following description illustrates embodiments and together with drawings to provide a further understanding of the disclosure described above.

A light-emitting device includes a current source module having a first transistor, a first voltage control module providing a negative voltage and a second voltage control module having a second transistor. The second voltage control module is electrically connected to the current source module and the first voltage control module.

A light-emitting device includes a current source module having a first transistor, a first voltage control module having a negative voltage-doubler and a second voltage control module electrically connected to the current source module and the first voltage control module. The second voltage control module has a second transistor.

A light-emitting device includes a current source module having a first transistor operated in a saturation region, a first voltage control module providing a negative voltage and a second voltage control module electrically connected to the current source module and the first voltage control module. The second voltage control module has a second transistor operated in a linear region.

DETAILED DESCRIPTION OF THE EMBODIMENTS

The drawings illustrate the embodiments of the application and, together with the description, serve to illustrate the principles of the application. The same name or the same reference number given or appeared in different paragraphs or figures along the specification should has the same or equivalent meanings while it is once defined anywhere of the disclosure. The thickness or the shape of an element in the specification can be expanded or narrowed.

Figure 1:
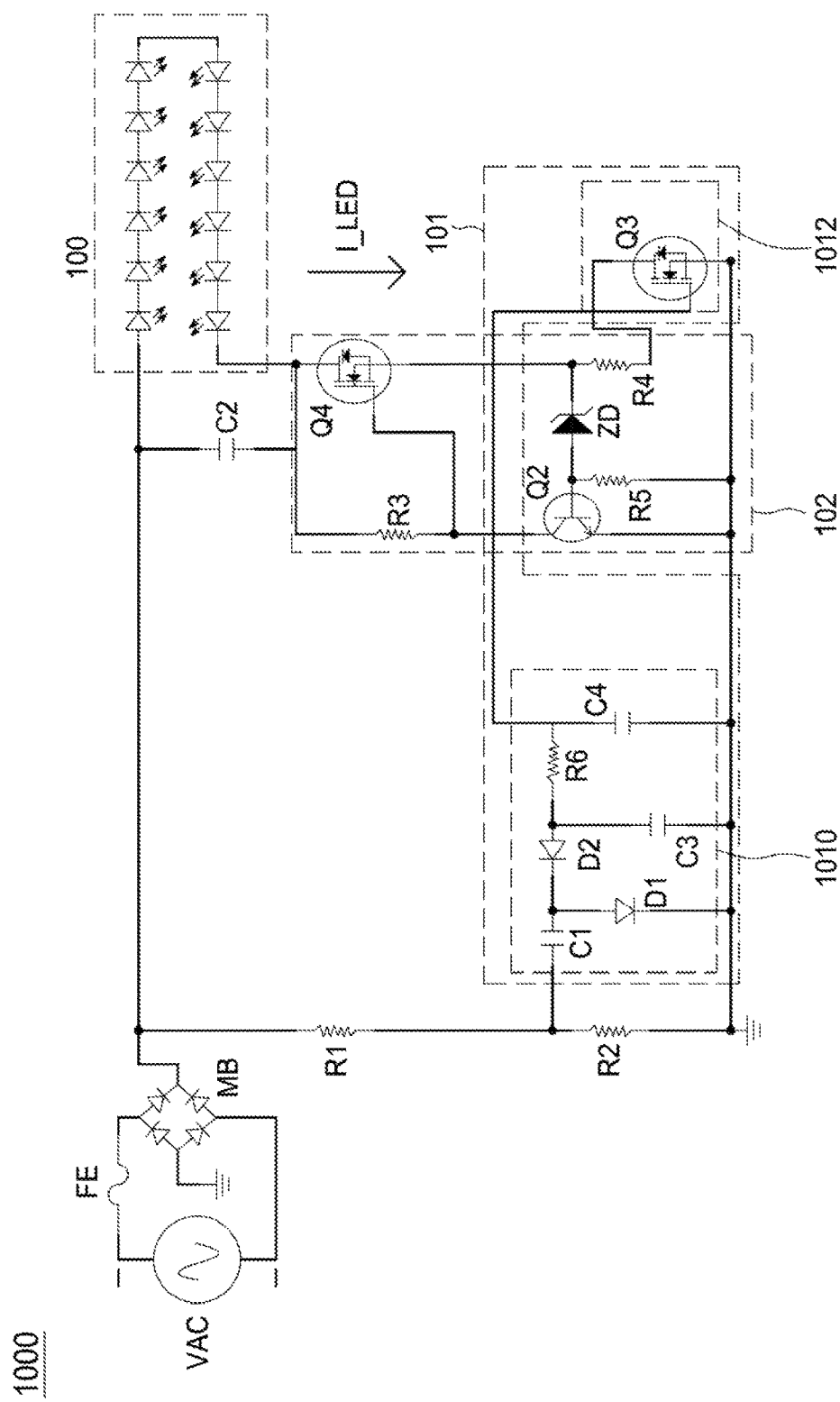
FIG. 1 shows a schematic of a light-emitting device in accordance with an embodiment of the present disclosure.

FIG. 1 shows a schematic of a light-emitting device in accordance with an embodiment of the present disclosure. The light-emitting device 1000 has a fuse FE connected to an AC input power source VAC, an LED module 100, a bridge rectifier MB connected between the fuse FE and the LED module 100, resistors R1, R2 connected to the bridge rectifier MB and the LED module 100, a voltage control module 101 connected to the resistors R1, R2 and a current source module 102 connected to the LED module 100 through a capacitor C2. The voltage control module 101 includes a first voltage control module 1010 and a second voltage control module 1012. In an embodiment, the fuse FE is omitted. The bridge rectifier MB includes four diodes, and all of the four diodes can be SBD (Schottky Barrier Diode). The bridge rectifier MB converts the voltage from the AC input power source VAC to a DC power VDC. For example, the AC input power source VAC can be 110 VAC, 220 VAC or 230 VAC provided by mains electric supply.

The first voltage control module 1010 includes capacitors C1, C3, C4, a resistor R6 and diodes D1, D2. The second voltage control module 1012 includes a transistor Q3. The transistor Q3 has a drain end connected to the current source module 102 and a gate end connected to the resistor R6 and the capacitor C4. The current source module 102 includes transistors Q2, Q4, resistors R3, R4, R5 and a Zener diode ZD. The current source module 102 is configured to provide a current I_LED to the LED module 100. To be more specific, the current I_LED is mainly provided by the transistor Q4 and the connected voltage control module 101. The transistor Q4 can be a high electron mobility transistor (HEMT) or a metal-oxide-semiconductor field effect transistor (MOSFET). In an embodiment, the transistor Q4 is an enhance mode transistor. However, the operation condition of the current source module 102 is changed in accordance with the AC input power source VAC. The current I_LED can be decreased while receiving larger AC input power source VAC to avoid excessive heat. The mechanism of decreasing current provided by the current source module 102 is to increase the equivalent resistance of the voltage control module 101, especially the equivalent resistance of the second voltage control module 1012 in the voltage control module 101. Therefore, the light-emitting device 1000 is operated under a substantially constant power. To be more specific, the power of the LED module 100 in the light-emitting device 1000 is restricted within a range without generating excessive amount of heat. The details of the modules during operation will be disclosed in the following portions.

Figure 2:
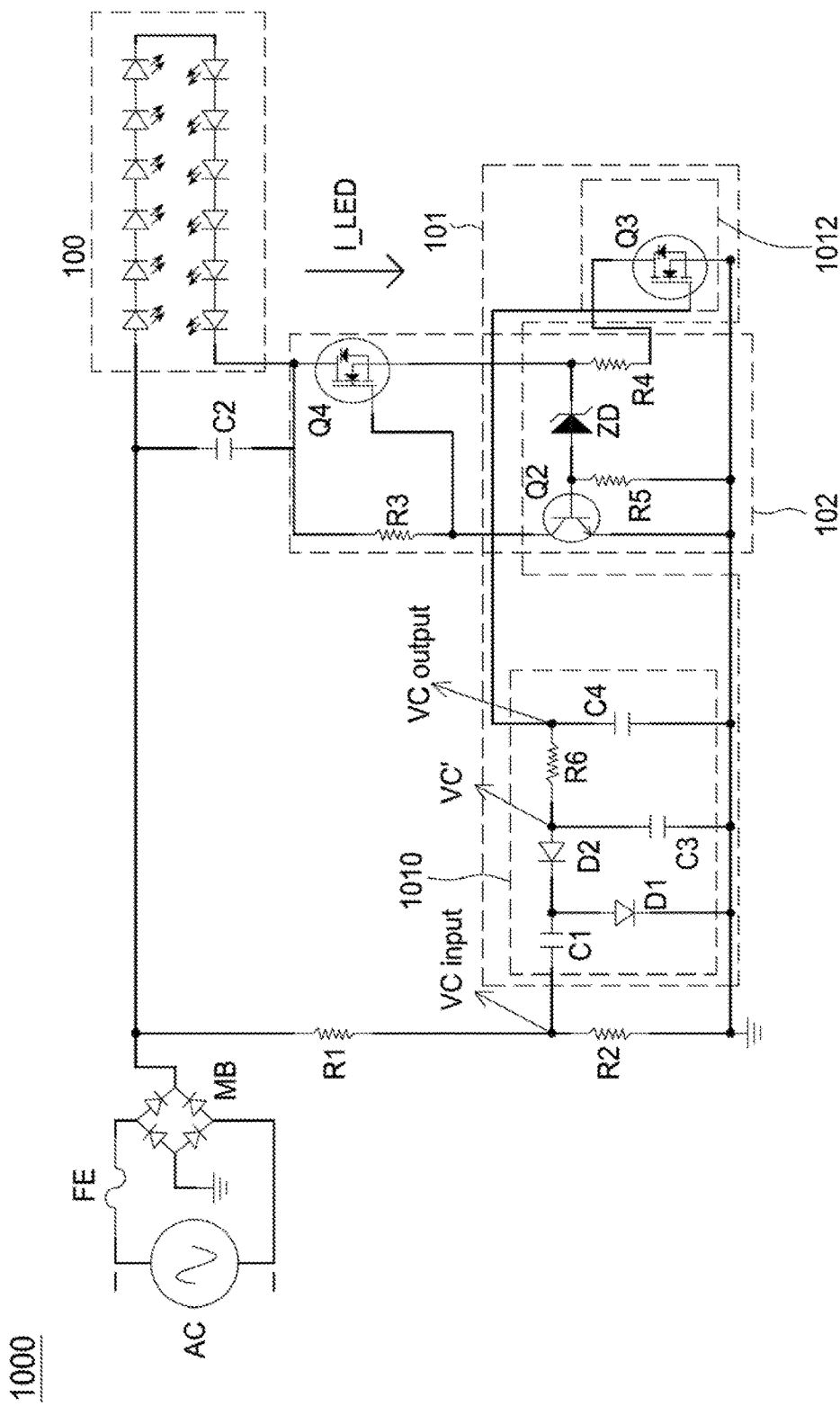
FIG. 2 shows a schematic of the light-emitting device operated in a first period in accordance with an embodiment of the present disclosure.

FIG. 2 shows a schematic of the light-emitting device operated in a first period in accordance with an embodiment of the present disclosure. In the first period, the current I_LED (not shown) is increasing. In another aspect, the higher input power source VAC provides a longer time period for the light-emitting device to turn on the LED module 100. Referring to FIG. 2, the AC input power source VAC is provided to be rectified by the bridge rectifier MB. The rectified voltage is then divided by the resistors R1 and R2. The first voltage control module 1010 is connected to the resistor R2. The input voltage VC input is applied to the capacitor C1 in the first voltage control module 1010. The capacitors C1, C3 and the diodes D1, D2 are functioned as a negative voltage-doubler. In other words, the absolute value of the voltage VC' is substantially twice as big as that of the input voltage VC. The voltage VC' is negative while the input voltage VC input is positive. The resistor R6 and the capacitor C4 are combined to be used as a buffer portion, and the value of the output voltage VC output is substantially equal to that of the voltage VC'. The buffer portion ensures the constancy of the output voltage VC output. In an embodiment, the buffer portion consisted of the resistor R6 and the capacitor C4 is omitted. To sum up, the first voltage control module 1010 turns the input voltage VC input (having a positive value) to be an output voltage VC output (having a negative value). The output voltage VC output is then provided to the transistor Q3. In an embodiment, the transistor Q3 is a depletion mode transistor having a negative threshold voltage. The output voltage VC output can be adjusted for different requirements, such as the type of the transistor Q3. In another embodiment, the transistor Q3 is an enhance mode transistor. The first voltage control module 1010 provides a voltage having a positive value to a gate end of the enhance mode transistor Q3. In another aspect, the value of the output voltage VC output is varied with the value of the AC input power source VAC.

Figure 3:
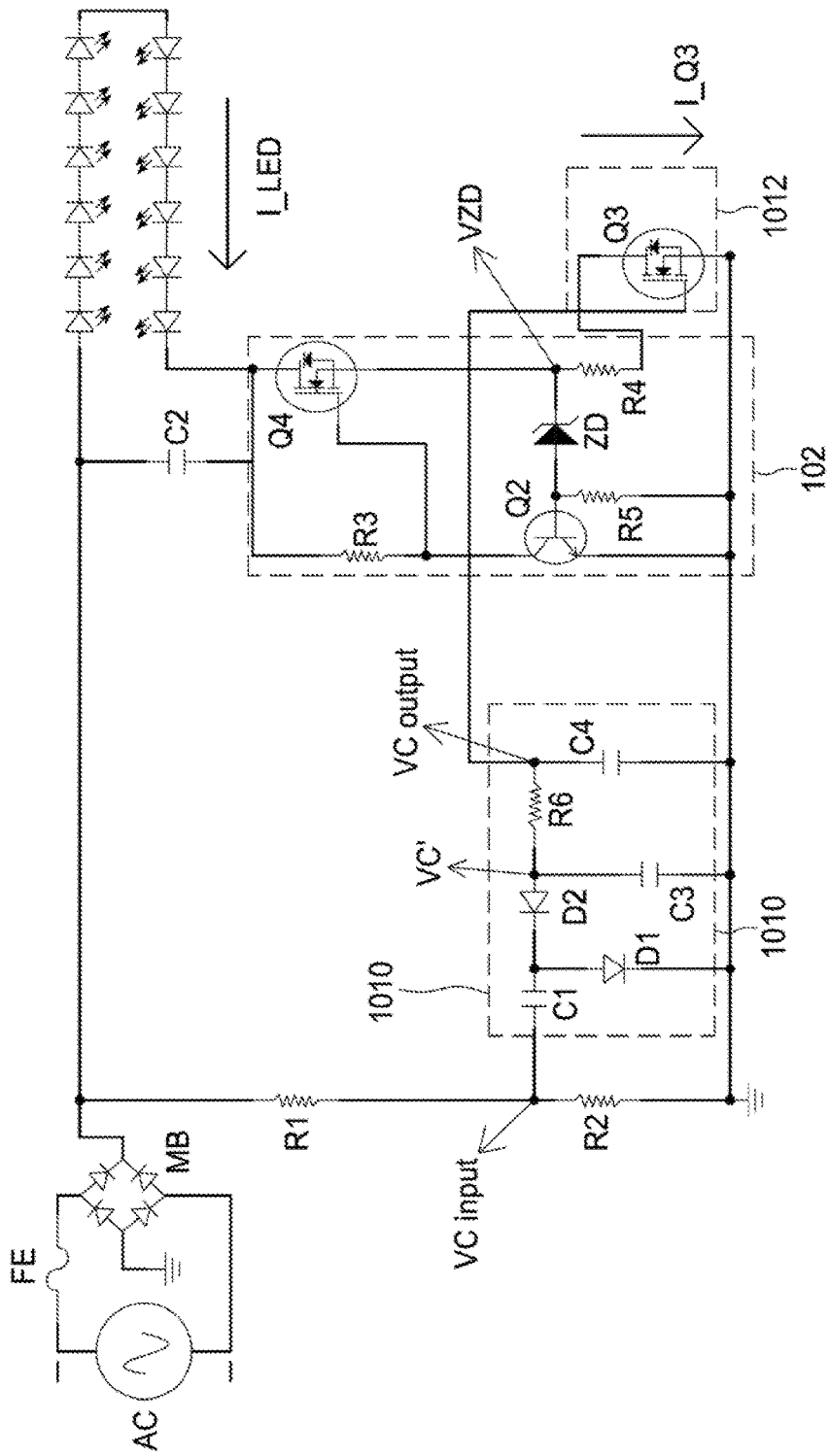
FIG. 3 shows a schematic of the light-emitting device operated in a first period in accordance with an embodiment of the present disclosure.

FIG. 3 shows a schematic of the light-emitting device operated in a first period in accordance with an embodiment of the present disclosure. Referring to FIG. 3, the output voltage VC output is provided to the transistor Q3 in the second voltage control module 1012. The transistor Q3 provides a current I_Q3 according to the output voltage VC output. It is noted, the current I_LED and I_Q3 are increasing in the first period. As discussed above, larger input power source VAC has a longer time period of a voltage value larger than a value of the threshold voltage of turning on the LED module 100. Therefore, the average values of current I_LED and the current I_Q3 are increased. In the first period, the voltage VZD is not large enough to reach a breakdown voltage of the Zener diode ZD. Therefore, the Zener diode ZD is operated in an open mode. In other words, no current passes through the Zener diode ZD from the resistor R4 to the resistor R5 while the Zener diode ZD is operated in an open mode. To be more specific, the input power source VAC is increasing to a level not larger than a specific value VSP during the first period.

In an embodiment, the transistor Q3 in the second voltage control module 1012 is a depletion mode transistor. The transistor Q3 is operated in a normally on mode. The transistor Q3 has a negative threshold voltage. Therefore, the current I_Q3 can be decreased while receiving a lower (or more negative) output voltage VC at the gate node of the transistor Q3. To be more specific, the peak value of the current I_Q3 is decreased. Meanwhile, the higher input power source VAC implies higher voltage VZD applied on the transistor Q3, which can increase the peak value of the current I_Q3. To sum up, the current I_Q3 is decreased while receiving a lower output voltage VC output at the gate end and increased while receiving a higher voltage VZD at the drain end. The variation of the peak value of the current I_Q3 depends on the amount of the value of the input power source VAC. In another aspect, the LED module 100 in the light-emitting device 1000 can be turned on for a longer time while receiving a higher input power source VAC. In other words, the turn-on time of the LED module 100 is increased to induce more current I_Q3 and I_LED. Therefore, the average value of the current I_Q3 is also increased in the first period.

It is noted, the transistor Q3 can be operated in a specific operation region for convenience of controlling the current I_Q3 during operation. In an embodiment, the transistor Q3 is operated in the linear region. In other words, the current I_Q3 provided by the transistor Q3 and the voltage between the drain end and the source end (VDS) of the transistor Q3 are linearly correlated. Therefore, the features of the transistor Q3, including equivalent resistance and operation condition, can be easily estimated while designing the light-emitting device 1000. In another embodiment, the transistor Q3 is operated in the saturation region and the current I_Q3 can be decreased with the increase of the voltage VZD applied to the drain end and the source end (VDS) of the transistor Q3 after the first period. Therefore, once the transistor Q2 fails, the current I_LED can be decreased by the transistor Q3 because of less current I_Q3 is provided to keep the power of the LED module 100 within a range without generating excessive amount of heat. The detail of the mechanism of the decreasing of the current I_Q3 and I_LED while receiving higher input power source VAC will be described in the following paragraphs. In other words, the transistor Q3 can be considered as a resistor having a variable resistance. The equivalence resistance of the transistor Q3 is increased with the increase of the input power source VAC to keep the LED module 100 to be operated under a substantially constant power. The transistor Q3 can be a high electron mobility transistor (HEMT) or a metal-oxide-semiconductor field effect transistor (MOSFET). In an embodiment, the transistor Q3 is a depletion mode transistor. In an embodiment, the transistor Q3 is an enhance mode transistor.

Figure 4:
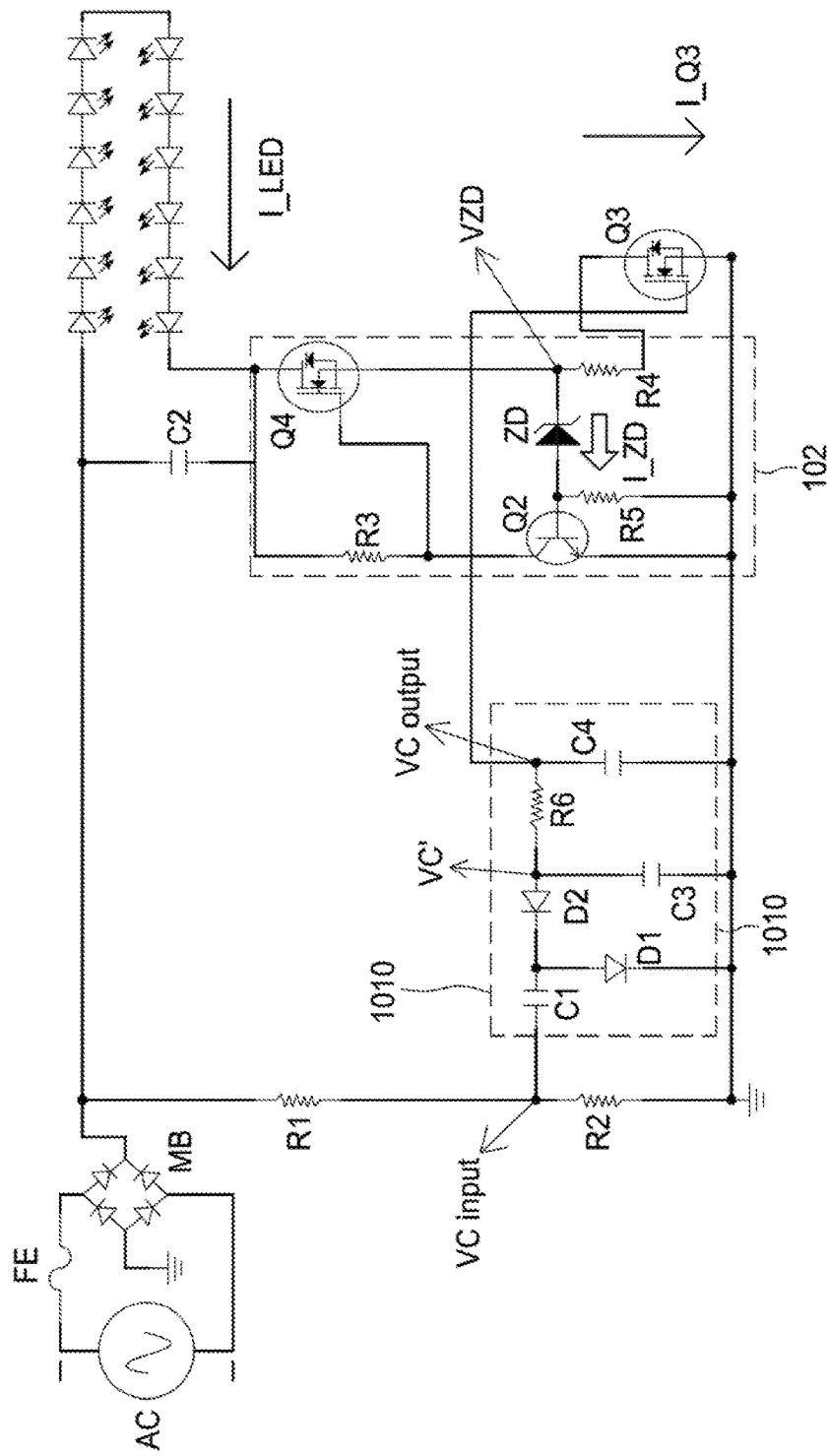
FIG. 4 shows a schematic of the light-emitting device operated in a second period in accordance with an embodiment of the present disclosure.

FIG. 4 shows a schematic of the light-emitting device operated in a second period in accordance with an embodiment of the present disclosure. In the second period, the input power source VAC is equal to or larger than the specific value VSP. The output voltage VC output is smaller in the second period than in the first period while the value of the input power source VAC is larger in the second period than in the first period. Therefore, the peak value of the current I_Q3 is limited and decreased in accordance with the value of the output voltage VC output. It is noted, the value of the current I_Q3 and the value of the current I_LED are positive correlated. That is, the peak value of the current I_LED is also limited and decreased along with the current I_Q3 in the second period. In addition, the average value of the current I_Q3 and the current I_LED are decreased with the increasing of the input power source VAC in the second period. In the second period, the output voltage VC output is applied to lower the peak values of the current I_LED and the current I_Q3 to overcome the influence from the increase of the input power source VAC. The voltage VZD is also increased to a level to change the operation mode of the Zener diode ZD to be operated in a breakdown mode. Then, the current I_ZD can be provided to pass through the Zener diode ZD from the resistor R4 to the resistor R5 in the second period. The voltage drop on the Zener diode ZD while operating under a breakdown mode is fixed to a predetermined value (i.e., the voltage drop is 1.5V). In another aspect, the voltage VZD is fixed when the Zener diode ZD is operated in the breakdown mode. The transistor Q2 is also turned on after the Zener diode ZD is operated in the breakdown mode. A portion of the current I_LED then passes the transistor Q2 after the transistor Q2 is turned on. The transistor Q2 can be can be a high electron mobility transistor (HEMT), a metal-oxide-semiconductor field effect transistor (MOSFET) or a bipolar junction transistor (BJT). In an embodiment, the transistor Q2 is a NPN-BJT. In the second period, the input power source VAC is increased after reaching the specific value VSP. Meanwhile, the time of emitting light of the LED module 100 is increased with the increase of the input power source VAC. The average current of the I_LED is expected to be increased. However, the increase of the input power source VAC also reduces the value of current I_Q3 by the increased voltage VZD. Therefore, the increase of the value of the current I_LED from the increase of the turn-on time of emitting light of the LED module 100 can't compensate the decrease from the variation of the current I_Q3. So, the average value of the current I_LED is decreased with the increase of the input power source VAC in the second period. The current I_LED is decreased in the second period and the light-emitting device 1000 is operated under a substantially constant power. The transistor Q3 is operated in the linear region during the first period and the second period. Furthermore, the transistor Q3 can be functioned as a resistor for adjusting the current I_Q3. In an embodiment, the transistor Q3 is operated in a saturation region.

Figure 5:
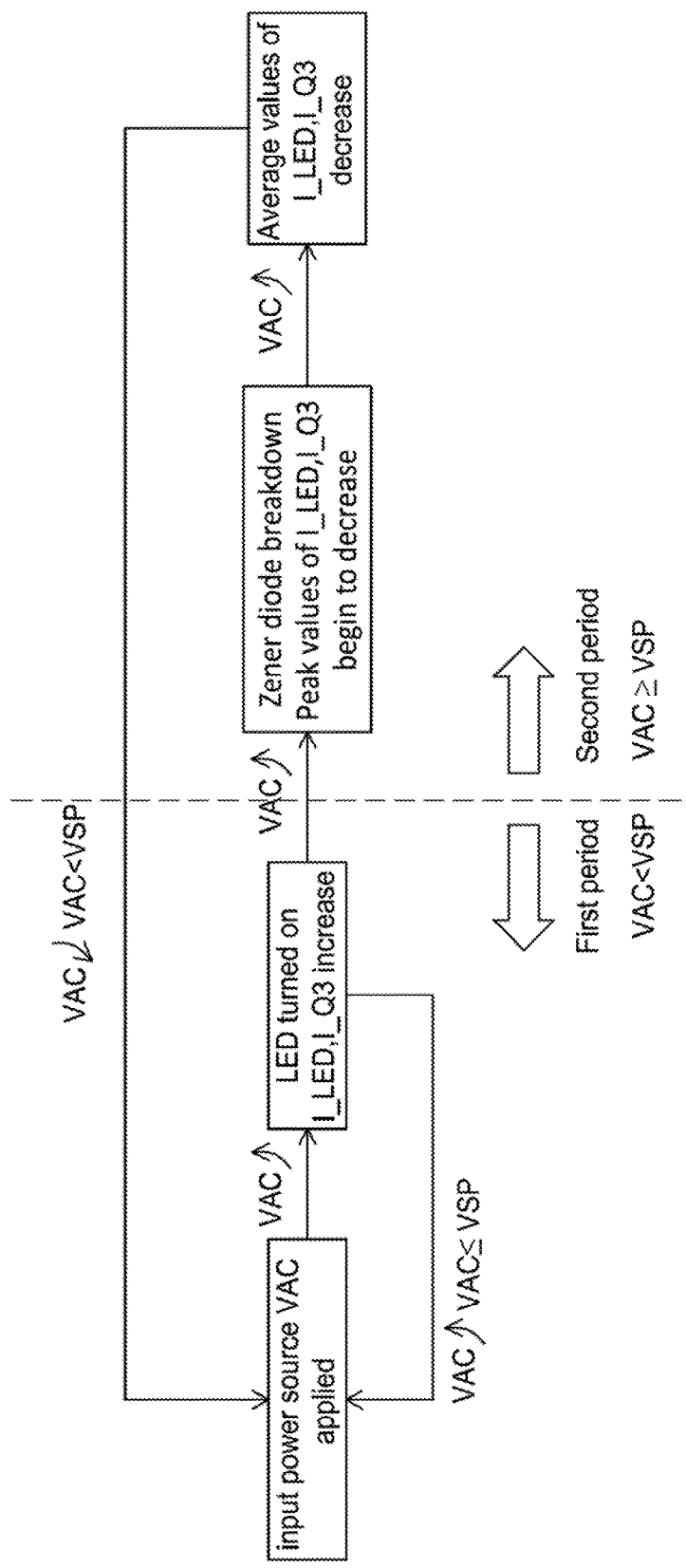
FIG. 5 shows a block diagram of the light-emitting device in accordance with an embodiment of the present disclosure.

FIG. 5 shows a block diagram of the light-emitting device 1000 in accordance with an embodiment of the present disclosure. In the first period, the input power source VAC is applied to turn on the LED module 100. The current I_LED and the current I_Q3 also increase with the increase of the input power source VAC in the first period. To be more specific, the average values and the peak values of the current I_LED and the current I_Q3 are increased in the first period. After the input power source VAC is increased to be equal to or larger than the specific value VSP, the light-emitting device 1000 is changed to be operated in the second period. In the second period, the Zener diode ZD is operated in the breakdown mode. The transistor Q2 is therefore turned on and a portion of the current I_LED passes through the transistor Q2. In another aspect, the values of the current I_LED and the current I_Q3 are decreased, and the peak value can be limited by adjusting the breakdown voltage of the Zener diode ZD. The output voltage VC output is also increased with the increase of the input power source VAC. The increase of the output voltage VC output which is applied to the gate end of the transistor Q3 reduces the peak value of current I_Q3. Therefore, the peak value of current I_LED is decreased in the second period. However, the effect of lower output voltage VC output applied on the transistor Q3 is larger than the effect of the increase of the input power source VAC. The average value of the current I_Q3 and the average value of the current I_LED are decreased in the second period. The detailed mechanism can be referred to the paragraphs above. The input power source VAC is consisted of periodical increasing portions and decreasing portions. Therefore, the peak or average values of the current I_Q3 and the current I_LED are not decreased until the input power source VAC is decreased to be lower than the specific value VSP. That is, the power of the LED module 100 is restricted within a range by decreasing the current I_Q3 while receiving an increased input power source VAC in the second period and increasing current I_Q3 while receiving a decreased input power source VAC in the first period. In other words, the operation mode of the light-emitting device 1000 is changed according to the condition of the input power source VAC between the first period and the second period to keep power of the LED module 100 in a restricted within a range.

Figure 6:
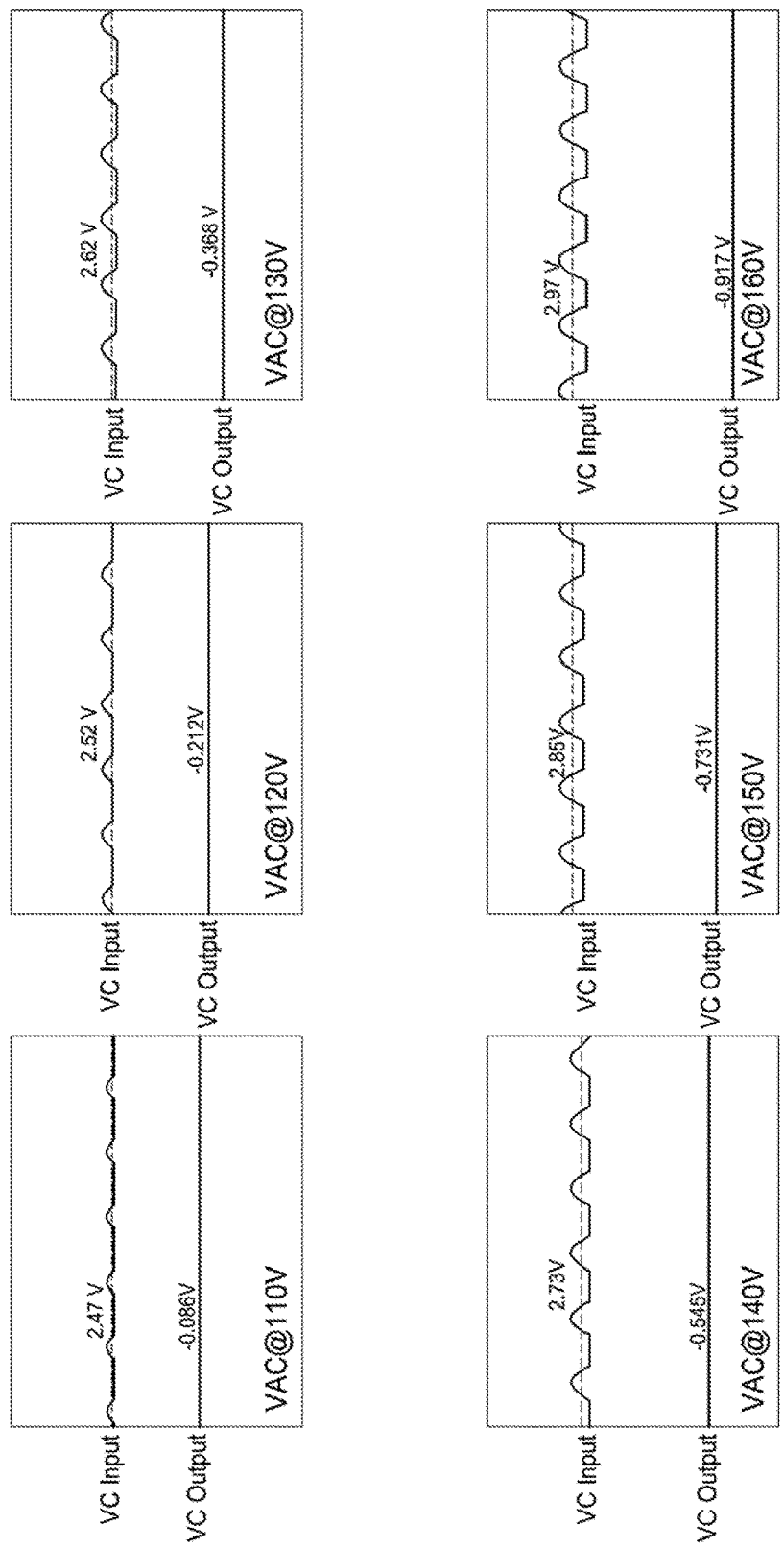
FIG. 6 shows waveforms of the light-emitting device in accordance with an embodiment of the present disclosure.

FIG. 6 shows waveforms of the light-emitting device in accordance with an embodiment of the present disclosure. Referring to FIG. 6, the six figures show the waveforms of the input voltage VC input and the output voltage VC output at different values of the input power source VAC. The waveform of the voltage VC input has a shape similar to connected repeated semicircles. As discussed above, the buffer portion is formed between the input voltage VC input and the output voltage VC output. Therefore, the waveform of the voltage VC output has less variation compared with the waveform of the voltage VC input. In other words, the maximum amplitude of the voltage VC output is smaller than that of the voltage VC input. The values of the input power source VAC and corresponding values of the voltage VC input and the voltage VC output are listed in the Table 1 as shown below. It is noted, the voltage VC input and VC output are average values measured during operation. As shown in Table 1, the values of the VC input and the absolute value of the VC output are increasing in a range of input power source VAC between 110V-160V. The voltage VC output generated by the first voltage control module 1010 is negative. Moreover, the amount of the current I_Q3 can be decreased by applying more negative voltage VC output to the transistor Q3.

TABLE 1

| | VAC (V) | | | | | |
|---|---|---|---|---|---|---|
| | 110 | 120 | 130 | 140 | 150 | 160 |
| VC input (V) | 2.47 | 2.52 | 2.62 | 2.73 | 2.85 | 2.97 |
| VC output (V) | −0.086 | −0.212 | −0.368 | −0.545 | −0.731 | −0.917 |

Figure 7:
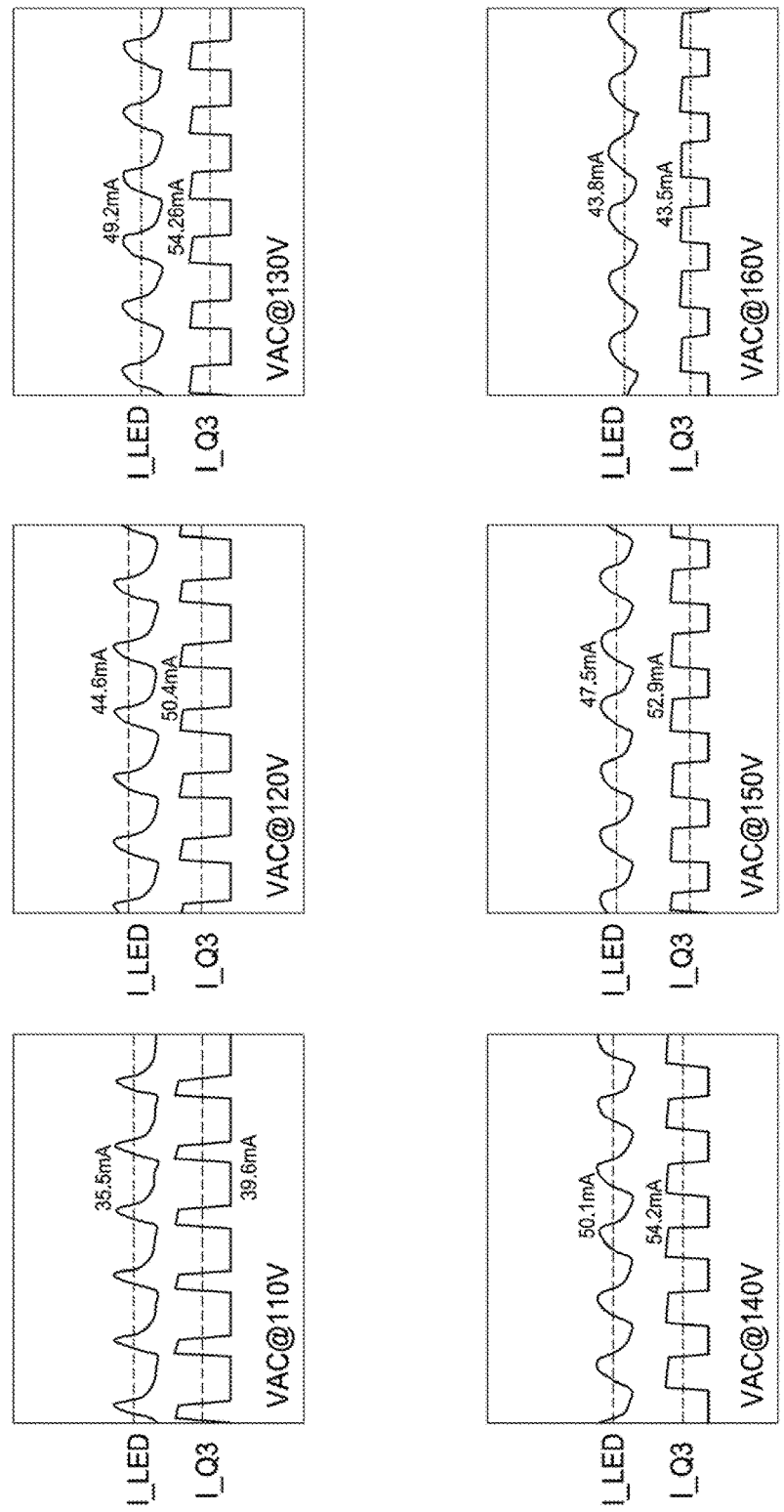
FIG. 7 shows waveforms of the light-emitting device in accordance with an embodiment of the present disclosure.

FIG. 7 shows waveforms of the light-emitting device in accordance with an embodiment of the present disclosure. Referring to FIG. 7, the six waveforms show the waveforms of the current I_LED and the current I_Q3 at different values of the input power source VAC. The average values of the current I_LED, average values of the current I_Q3 and the values of input power source VAC are listed in the Table 2. As shown in FIG. 7, the shapes of the waveforms of the current I_LED are similar with each other under different input power sources VAC from 110V to 160V. Similarly, the shapes of the waveforms of the current I_Q3 are similar with each other under different input power sources VAC. The waveform of the current I_LED is different from that of the current I_Q3. The waveform of the current I_Q3 has a shape similar to repeated pulses. The waveform of the current I_LED has a shape similar to repeated triangles. Referring to Table 2, the average values of the current I_LED are increased under input power sources VAC from 110V to 140V and decreased under input power sources VAC from 140V to 160V. The increase of the average values of current I_LED and the current I_Q3 results from higher input power source VAC which enables the light-emitting device having more time for turning on the LED module 100. To be more specific, the LED module in the light-emitting device can be turned on for a longer time while receiving a higher input power source VAC. Then, the current I_LED as shown in Table 2, decreases from a period of receiving an input power sources VAC having a value of 140V to 160V. That is, the increase of time for turn on the LED module 100 by receiving higher input power sources VAC cannot compensate the decrease of the current I_Q3 by receiving lower output voltage VC output (as shown in FIG. 6 and Table 1). It is noted, the average values of the current I_LED and I_Q3 are increased and decreased during operation, and the shapes of the waveforms of the current I_LED and I_Q3 are not affected by the increase or decrease of the current during operation. In other words, the shapes of the waveforms of the currents I_LED and I_Q3 are not sensitive to the input power source VAC.

TABLE 2

|  | VAC (V) | | | | | |
|---|---|---|---|---|---|---|
|  | 110 | 120 | 130 | 140 | 150 | 160 |
| I_LED (mA) | 35.5 | 44.6 | 49.2 | 50.1 | 47.5 | 43.8 |
| I_Q3 (mA) | 39.6 | 50.4 | 54.26 | 54.2 | 52.9 | 48.5 |

Figure 8:
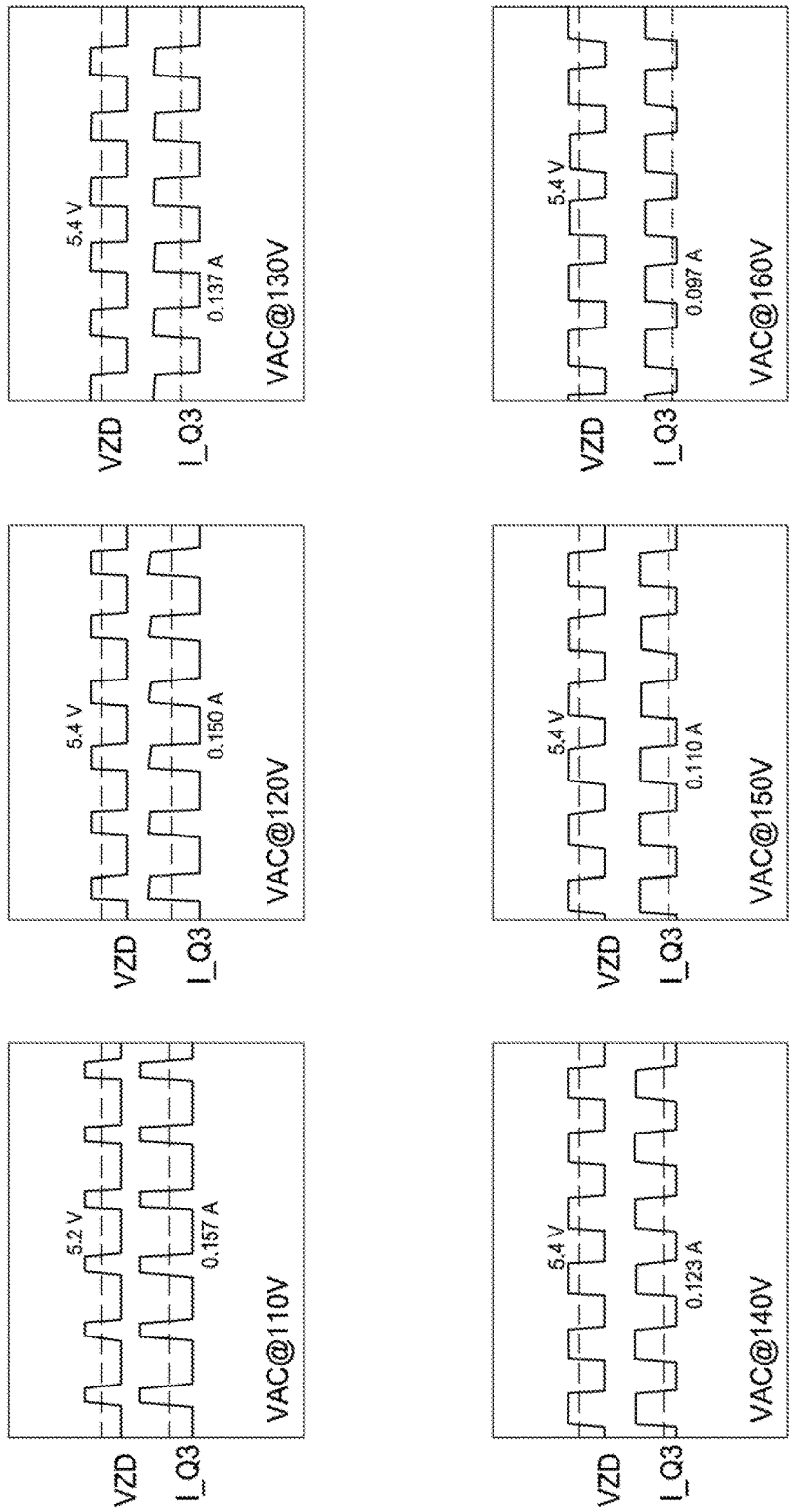
FIG. 8 shows waveforms of the light-emitting device in accordance with an embodiment of the present disclosure.

FIG. 8 shows waveforms of the light-emitting device in accordance with an embodiment of the present disclosure. Referring to FIG. 8, the six waveforms show the waveforms of the voltage VZD and the current I_Q3 at different values of the input power source VAC. The waveform of the voltage VZD is similar with that of the current I_Q3. The waveforms of the current I_Q3 and the voltage VZD are similar to periodical pulses. The peak values of the current I_Q3, the peak values of the voltage VZD and an equivalent resistance RES are listed in the Table 3 as shown below. As discussed above, the voltage VZD will be fixed when the Zener diode ZD is operated in the breakdown mode. Referring to Table 3, the peak values of the voltage VZD is fixed at 5.4V when the input power source VAC is increased to 120V. Meanwhile, the peak value of the current I_Q3, as shown in the Table 3, begins to decrease. To be more specific, the peak value of the current I_Q3 decreases from 0.150 A (related to an input power source VAC of 110V) to 0.097 A (related to an input power source VAC of 160V). The decrease of the current I_Q3 between the values related to input power source VAC of 110V and 120V results from lower output voltage VC output. The decreased amount of current I_Q3 between input power source VAC of 110V and 120V is less than that between input power source VAC of 120V and 130V wherein the Zener diode ZD is operated in the breakdown mode. That is, the voltage VZD is fixed to a predetermined value and the light-emitting device is operated in the second period as discussed above. In other words, the increase of the peak value of the current I_Q3 from the increase of the input power source VAC can't compensate the decrease of the lower voltage VC output applied to the transistor Q3. The current I_Q3 begins to decrease when the Zener diode ZD is breakdown. The values of the equivalent resistance RES can be derived from an equation below:

$$RES = (VZD)/(I\_Q3).$$

The equivalent resistance RES is increased, as shown in Table 3. It is noted, the equivalent resistance RES derived from the equation neglects the effect of the resistor R4. The value of the resistor R4 is much smaller than that of the transistor Q3. In an embodiment, the resistor R4 is omitted. The transistor Q3 or the second voltage control module 1012 can be functioned as a resistor having a resistance increasing with the increase of the input power source VAC. In other words, the embodiment discloses a variable resistance (i.e. RES) which is increased to decrease the current (i.e. I_Q3 and I_LED) for lowering the heat dissipation. In another aspect, the current I_LED is also decreased to avoid a current larger than a safety operation range of the LED module 100 provided to the LED module 100.

TABLE 3

|  | VAC (V) | | | | | |
|---|---|---|---|---|---|---|
|  | 110 | 120 | 130 | 140 | 150 | 160 |
| VZD (V) | 5.2 | 5.4 | 5.4 | 5.4 | 5.4 | 5.4 |
| I_Q3 (A) | 0.157 | 0.15 | 0.137 | 0.123 | 0.11 | 0.097 |
| RES | 33.12 | 36.0 | 39.4 | 43.9 | 49.1 | 55.6 |

It will be apparent to those having ordinary skill in the art that various modifications and variations can be made to the devices in accordance with the present disclosure without departing from the scope or spirit of the disclosure. In view of the foregoing, it is intended that the present disclosure covers modifications and variations of this disclosure provided they fall within the scope of the following claims and their equivalents.

What is claimed is:

1. A light-emitting device, comprising:
   a current source module comprising a first transistor, and a Zener diode electrically connected to the first transistor in series;
   a first voltage control module; and
   a second voltage control module electrically connected to the current source module and the first voltage control module, and comprising a second transistor.

2. The light-emitting device according to claim 1, wherein the first voltage control module further comprises a negative voltage-doubler.

3. The light-emitting device according to claim 2, wherein the negative voltage-doubler is consisted of two capacitors and two diodes.

4. The light-emitting device according to claim 1, wherein the second transistor has a first end connected to the first voltage control module, and a second end connected to the first transistor.

5. The light-emitting device according to claim 1, wherein the second transistor is a HEMT.

6. The light-emitting device according to claim 5, wherein the second transistor has a gate end connected to the first voltage control module, and a drain end connected to the first transistor.

7. The light-emitting device according to claim 1, wherein the first voltage control module further comprises a buffer portion, the buffer portion is connected to the second voltage control module.

8. The light-emitting device according to claim 1, wherein the first transistor is configured to operate in a saturation region and the second transistor is configured to operate in a linear region.

9. A light-emitting device, comprising:
a current source module comprising a first transistor;
a first voltage control module comprising a negative voltage-doubler; and
a second voltage control module electrically connected to the current source module and the first voltage control module, and comprising a second transistor.

10. The light-emitting device according to claim 9, further comprising a Zener diode electrically connected to the first transistor and the second voltage control module.

11. The light-emitting device according to claim 9, wherein the negative voltage-doubler is consisted of two capacitors and two diodes.

12. The light-emitting device according to claim 9, wherein the second transistor has a first end connected to the first voltage control module, and a second end connected to the first transistor.

13. The light-emitting device according to claim 9, wherein the second transistor is a depletion mode HEMT.

14. The light-emitting device according to claim 13, wherein the second transistor has a gate end connected to the first voltage control module, and a drain end connected to the first transistor.

15. The light-emitting device according to claim 9, wherein the first voltage control module further comprises a buffer portion, the buffer portion is connected to the second voltage control module.

\* \* \* \* \*